Aug. 18, 1959 D. H. JONES ET AL 2,900,625

HEAD POSITIONING DEVICE

Filed June 24, 1955 2 Sheets-Sheet 1

INVENTORS:
Don H. Jones
Lyle M. Stone

By Earl Bennett
Louis A Kline
John T. Matlago, agent
Their Attorneys.

HEAD POSITIONING DEVICE

Filed June 24, 1955 2 Sheets-Sheet 2

INVENTORS:
Dan H. Jones
Lyle M. Stone
By Earl Bent
Louis A Kline
John J. Matlago, Agent
Their Attorneys 2,900,625

HEAD POSITIONING DEVICE

Dan H. Jones, Redondo Beach, and Lyle M. Stone, Hollydale, Calif., assignors to The National Cash Register Company, Dayton, Ohio, a corporation of Maryland Application June 24, 1955, Serial No. 517,707

8 Claims. (Cl. 340—174)

This invention relates to mounting means for magnetic transducers and more particularly to an adjustable head mount assembly for use in conjunction with magnetic storage devices.

A magnetic drum memory, as employed in digital computers, commonly utilizes a read head spaced a specified distance from a record head on the same channel of the drum so as to precisely define a delay period as required in a feedback loop or data recirculation line. Such lines provide for data generated by an arithmetic unit to be deposited by means of the record head onto a data channel provided on the moving drum. This data channel then passes under the read head which routes the information back into an arithmetic unit where it may be operated upon and again recorded on the drum by means of the record head.

Inasmuch as the time delay between the recording and the reading of a signal on the drum is dependent upon the relative spacing of the heads thereon, it is of utmost importance that the heads be mounted so that they are capable of rapid, precise adjustment in order to have the required delay come within a predetermined time basis established by a clock recording provided on another channel of the drum. One way of realizing this adjustment is to reposition the heads while the drum is rotating so as to bring the waveform of a reference signal sensed from the data channel by the read head into proper phase relation with the waveform of a reference signal obtained by scaled-down signals sensed from the clock channel by the clock head.

It is, accordingly, an object of this invention to provide a head mount assembly which can be used to effect rapid, precise adjustments of magnetic heads or transducers about the sensitized surface of a moving storage medium.

Another object of this invention is to provide a head mount that enables a head to be tangentially adjusted about the surface of a storage drum by rotating an eccentric sleeve which holds the head mount in the barrel surrounding the drum.

Another object of this invention is to provide a head mount assembly which permits a magnetic head to be maintained in an optimum position relative to the surface of the drum, resulting in an improved output signal therefrom.

Briefly, the preferred embodiment of the invention comprises a tubular housing having a magnetic transducer or head affixed in one end thereof. The tubular housing has such a frictional fit in an eccentric sleeve, which is in turn tightly held in a barrel surrounding the drum memory, that the operator can manually urge the housing into the sleeve and yet the friction is sufficient to maintain the housing in position when subjected to the most severe shocks and vibrations under which the memory operates. The tubular housing is pushed into the sleeve until the head on the end thereof lightly contacts the peripheral surface of the rotating drum. It has been determined that this method of mounting the head enables it to radially position itself with a minimum of clearance between the head and the moving surface of the drum. The inwardly directed radial adjustment, once made, can be maintained relative to the sleeve by tightening a set screw, for example, in a locking collar which encompasses the tubular housing. This method of mounting further permits the operator to manually rotate the tubular housing in its mounting hole so that the magnetic poles of the head are positioned for maximum response with the channel. In order to effect the precise repositioning of a head along the direction of travel of the drum surface relative to another head, a spanner wrench is used, for example, to rotate the eccentric sleeve, in which the head mount is held relative to the barrel.

A better understanding of this invention as well as a realization of additional objects and features thereof may be obtained by reference to the following description of the drawings in which.

Figure 1:
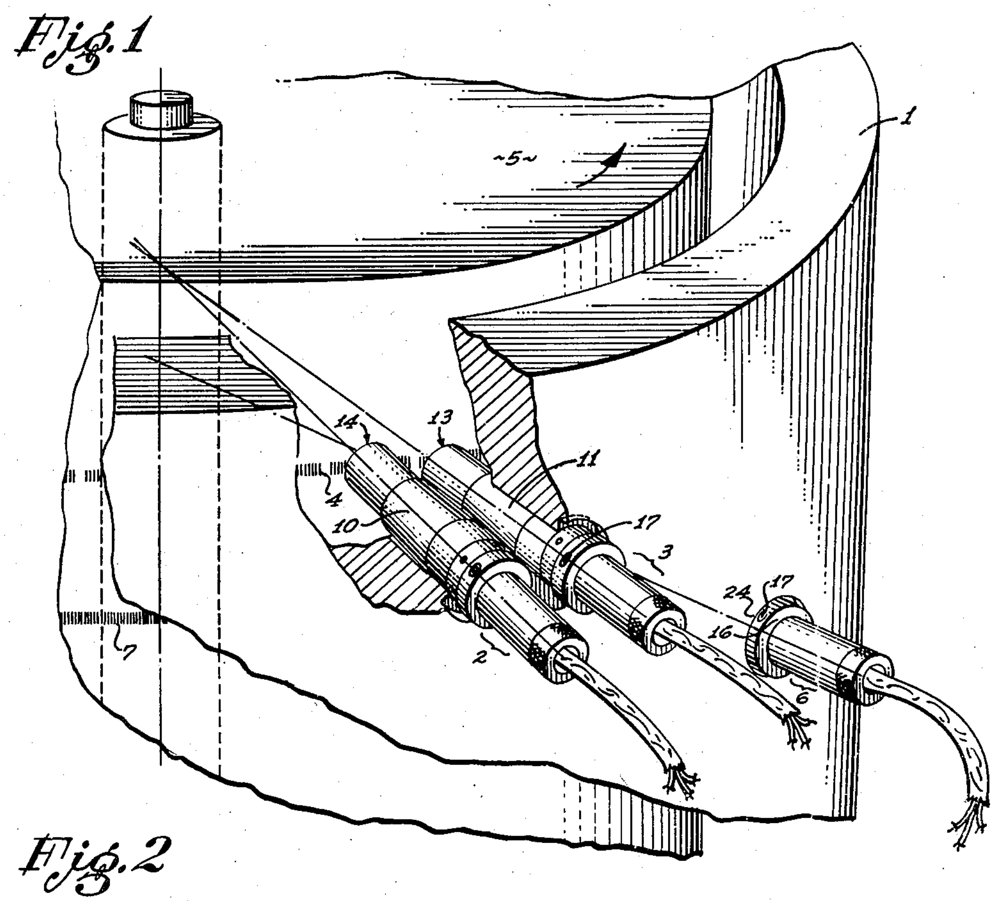
Fig. 1 is a perspective view of a portion of a magnetic drum assembly showing how the head mounts, including a pair positioned to form a data recirculation line, are held in a barrel encompassing the drum.

Referring first to Fig. 1, a perspective illustration of a magnetic drum type memory, typical of those used with a digital computer is shown. The drum barrel 1 encloses a rotating drum 5, the peripheral surface of which has a coating of ferric oxide for magnetically storing bits of information. The head mounts disclosed by the present invention are shown positioned in drum barrel 1. For simplicity, only three such head mounts are shown. Record head mount 2 and read head mount 3 positioned on track 4 of drum 5 are used to form a recirculating loop well understood in the computer art, as previously discussed. Read head mount 6 cooperates with a clock track 7 of the drum 5 to generate timing signals.

Figure 2:
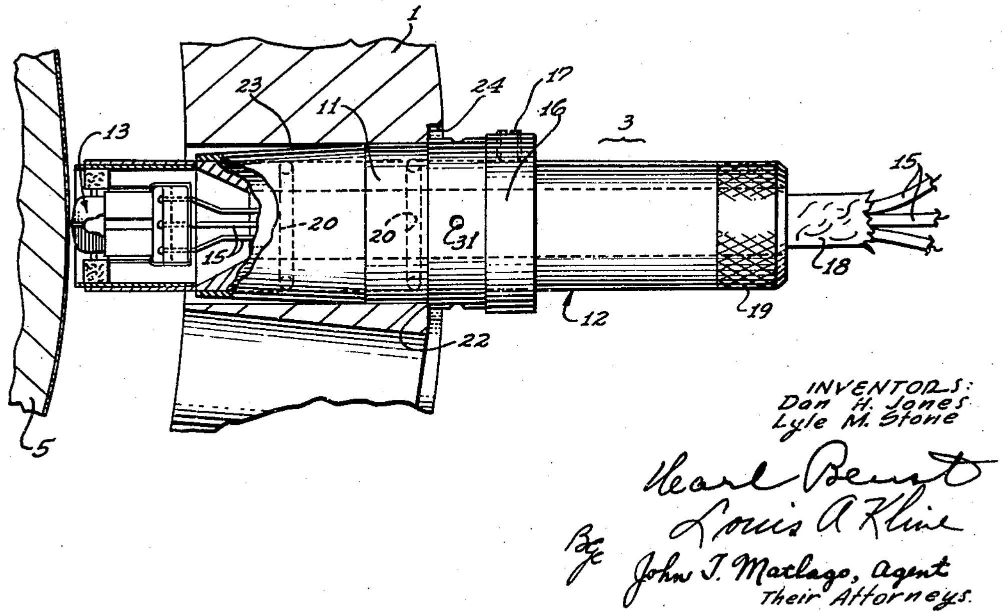
Fig. 2 is a partially cut-away plan view of the head mount positioned in the drum barrel.

As shown in Fig. 2, which is a partially cut-away plan view of the head mount 3 positioned in the drum barrel, each of the head mounts shown in Fig. 1 includes a tubular housing 12 with a magnetic head 13 extending from the inner end thereof. The electrical leads 15 from magnetic head 13 are twisted so as to form a single composite lead 18 which passes through the center of tubular housing 12 and ultimately connects to a suitable plug-in type terminal (not shown). The outer end 19 of tubular housing 12 is knurled in order to facilitate adjustment thereof.

Figure 3:
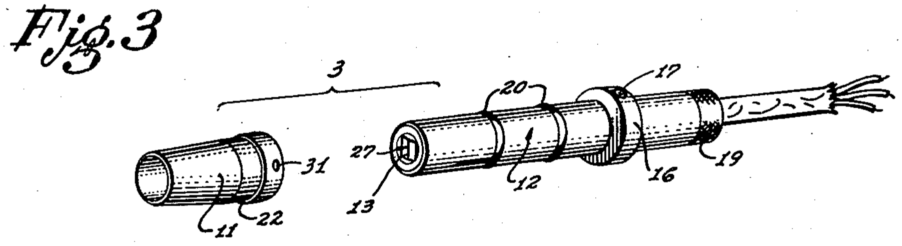
Fig. 3 is a perspective view of the head mount and the eccentric sleeve.

As seen in Figs. 2 and 3, a rubber retaining ring 20 fits into each of a pair of circumferential grooves provided on the outer surface of tubular housing 12. These retaining rings enable the housing to be easily urged into position in its mounting hole and at the same time provide sufficient friction to maintain the tubular housing in a fixed position relative to the drum barrel 1.

As previously discussed, the spacing between record head mount 2 and read head mount 3 is critical because the distance between the gaps in the heads attached to the ends thereof governs the delay in time between the sensing and recording of a given signal as needed to form a recirculation register, for example, in a digital computer. Thus, in order to achieve this precise time delay, eccentric sleeves 10 and 11 are used as adapters for positioning the head mounts 2 and 3, respectively, in drum barrel 1 in a manner to be hereinafter described. It should be noted that the head mount 6 sensing clock channel 7 is positioned in drum housing 1 without the need for an adapter, such as eccentric sleeve 11, since it need not be critically positioned with respect to other heads on the clock track.

As shown in Fig. 2, the upper body of eccentric sleeve 11 is tightly held in a lapped hole 23 in barrel 1, such that shoulder 22 thereof rests against a counterbored opening 24 provided in the outer wall of barrel 1. This results in such a tight fit that a spanner wrench is required to rotate sleeve 11.

As previously mentioned, to assemble the heads in the memory, tubular housing 12 is inserted in sleeve 11 by merely rotating the knurled end 19, by hand, the only friction which has to be overcome being that provided by retaining rings 20. Thus, with the drum rotating, having once positioned tubular housing 12 so that the head 13 on the inner end thereof touches the drum surface, contact with the drum surface will push the head 13 out just enough so that it no longer touches. The head is then operating as close to the drum surface as possible, and is held in this radially adjusted position by sliding a lock collar 16 on the tubular housing 12 tightly against the end of sleeve 11 and tightening set screw 17. Thus, although the head 13 cannot move inwardly, if for any reason the drum expands through temperature rise, etc., the head can be pushed out without causing damage to the oxide surface of the drum.

Owing to the close proximity of the heads with the sensitized periphery of the drum obtained by this method of mounting, having once properly rotationally aligned the gap of the head relative to the channel on the drum, the resulting signal output generated by the head shows a marked improvement over that attained by former methods which provide for positioning and rigidly holding a head to have a fixed clearance with respect to the drum surface.

Eccentric sleeve 11 is used as a tangential spacing adjustment. This adjustment is best made while the drum is rotating and a visual indication of pulse spacing is available on an oscilloscope screen. Thus, by rotating the eccentric sleeve 11, the entire head mount assembly is rotated in either a clockwise or counterclockwise direction which results in a corresponding increase or decrease in the relative spacing of the head relative to the other head on the channel.

Figures 4, 5:
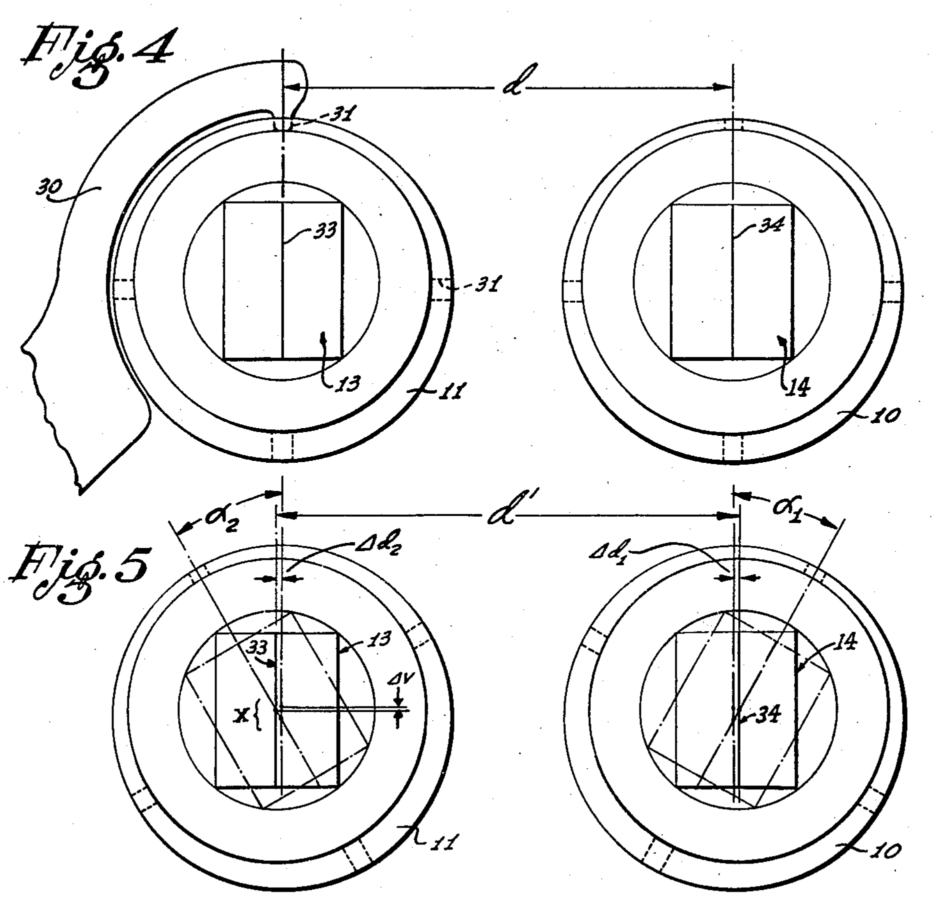
Figs. 4 and 5 are illustrations explaining how the eccentric sleeves, in which the head mounts are positioned, can be adjusted to change the relative circumferential spacing of the heads.
Figure 6:
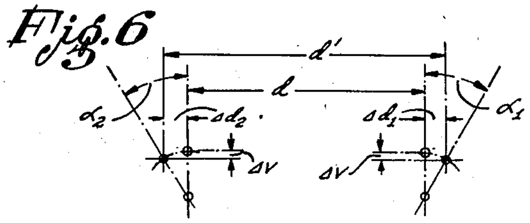
Fig. 6 is a diagram illustrating more clearly the adjustment shown in Fig. 5.

The adjustment of the spacing of heads 13 and 14 of Fig. 1 by use of eccentric sleeves 10 and 11 will now be considered in greater detail. Fig. 4 is an illustrative view of the ends of the heads 13 and 14 in Fig. 1 as seen from the drum surface. Gap centers 33 and 34 of read head 13 and record head 14, respectively, are shown spaced a distance $d$ apart, i.e., a predetermined number of clock pulses as defined by signals generated by the timing signal channel 7. Head spacing $d$ is varied by rotating eccentric sleeves 10 and 11. A suitable tool, e.g., a spanner wrench 30, inserted into holes 31 spaced about the head of eccentric sleeve 11 can be used to provide the necessary rotation. Preferably, both eccentric sleeves 10 and 11 are rotated to approximately the same degree, in opposite directions, as noted by angles $\alpha_1$ and $\alpha_2$, respectively, in order to effect the new head spacing $d'$, as shown by Fig. 5. The gap centers 33 and 34 are now varied to a new distance $d'$. It is to be noted that although there is a slight vertical displacement $\Delta V$ which accompanies the horizontal displacement of the heads, it is not of sufficient magnitude to seriously deflect the heads from alignment with the proper magnetic channel on the drum periphery. Further, it should be noted that by initially inserting eccentric sleeves 10 and 11 so that the circular openings thereof are displaced on the same side of the center lines of their mounting holes in the drum barrel, and equally rotating both the sleeves, the vertical displacement of the heads is the same. A clearer illustration of this adjustment is presented in Fig. 6 which is a more detailed showing of area X in Fig. 5.

The maximum head spacing adjustment $\Delta d$, obtainable with a sleeve for a half-inch diameter head housing, may be on the order of .040 inch. Under these conditions, the maximum out-of-channel adjustment $\Delta V$ will only be on the order of .010 inch. Assuming the width of a clock pulse recording on the drum periphery is on the order of .014 inch, the total maximum time delay adjustment provided for by the use of an eccentric sleeve is thus on the order of .040/.014 or 2.86 clock pulses. This is considered sufficient to correct the error in spacing of the heads for a recirculating register caused by machining limitations, etc. of being able to precisely locate the heads in the drum barrel within the accuracy of division of the drum surface obtained by the clock recording. As shown by Fig. 5, rotating the sleeve with the head mount inserted therein, as required by this adjustment, causes the gap of the head to be out of alignment, thus the tubular housing must be again rotated relative to the sleeve; but since the tubular head mount is frictionally held in the sleeve only by the rubber retaining rings, the adjustment can be readily made manually.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. Apparatus for positioning magnetic transducing heads about the magnetizable surface of a rotating drum comprising a tubular housing having a magnetic transducing head mounted on one end thereof; a resilient friction-aiding material on the peripheral surface of said housing; and an eccentric sleeve tightly held in a barrel surrounding said drum in which said housing is held by said friction-aiding material, whereby said friction-aiding material enables said housing to be manually positioned relative to said eccentric sleeve for radial and rotational alignment of said head, and whereby said eccentric sleeve can be forceably rotated to displace said head about the surface of said drum.

2. Apparatus for positioning magnetic transducing heads as required to form a recirculating loop on a magnetic drum memory comprising a first and second eccentric sleeve arranged to be frictionally mounted in respective openings spaced on a barrel positioned about the periphery of said drum; and a first and second tubular housing, each having a magnetic head mounted on the end thereof, capable of being manually positioned in said respective sleeves, whereby the relative spacing of said magnetic heads about a channel of said memory can be adjusted to correct for a precise time delay as required in the recirculating loop by rotating said sleeves relative to said barrel.

3. Apparatus for positioning magnetic transducing heads about the magnetizable surface of a rotating drum comprising a tubular housing; a magnetic transducing head mounted in one end of said tubular housing; a plurality of retaining rings recessed into the peripheral surface of said housing; and an eccentric sleeve by which said tubular housing is held in a barrel surrounding said magnetic drum, whereby the frictional fit resulting from said retaining rings is such that said housing can be manually adjusted relative to said eccentric sleeve for radial and rotational alignment of said head with respect to the drum surface, and whereby said eccentric sleeve can be forceably rotated to displace said head about the drum surface.

4. Apparatus for holding a magnetic transducing head with a minimum of clearance relative to the magnetizable surface of a rotating drum comprising a tubular housing; a magnetic head affixed to the end of said tubular housing; mounting means for enabling said tubular housing to radially position itself relative to the surface of the rotating drum by contact with said surface pushing the head out just enough so that it no longer touches; means for holding said tubular housing relative to the surface of said rotating drum such that the housing is prevented from any further inward radial movement but can move radially outward due to further contact with said surface; and means supporting said mounting means for adjusting said head tangentially about the surface of the drum.

5. Apparatus for positioning and holding a magnetic head relative to the moving surface of a rotating drum with a minimum of clearance comprising: a tubular housing; a head having magnetic poles affixed to the end of said housing; and mounting means for enabling said housing to position itself and to be fully supported in position by said mounting means relative to the surface of the rotating drum by momentary contact of the poles of the head with said moving surface forcing the housing radially outward just enough so that the poles no longer touch the surface.

6. Apparatus for mounting a magnetic head relative to the surface of a rotating drum comprising: a tubular housing; a magnetic head affixed to the end of said housing; means for enabling said housing to position itself in a slightly spaced relation to the surface of the drum by contact of the head with said moving surface forcing the housing radially outward just enough so that the head no longer touches the surface; and means for holding said housing in said position relative to the surface of said rotating drum such that the housing is prevented from any further inward radial movement but can be moved radially outward to a new position due to further contact of the head with said surface.

7. Apparatus for holding and positioning a magnetic head relative to a moving magnetizable surface of a drum for maximum signal response comprising: a tubular housing; a magnetic head affixed to the end of said housing; and mounting means frictionally holding said housing in position so that it can be repositioned in said mounting means with the head having a slightly spaced relation to the surface of the drum as a result of being forced radially outward due to contact of the head with said moving surface.

8. Means for effecting fine adjustment of a signal transducing element relative to the surface of a signal storage medium comprising: a rigid supporting member having a bore formed therethrough; and an adjusting member located in said bore and having a close fit therein over at least part of its length, the adjusting member being rotatable about its longitudinal axis within said bore and the transducing element being eccentrically mounted within said adjusting member and being constrained thereby to describe an arcuate path upon rotation of said adjusting member.

References Cited in the file of this patent

UNITED STATES PATENTS

| | | |
|---|---|---|
| 2,680,785 | Franklin | June 8, 1954 |
| 2,708,693 | Henderickson | May 17, 1955 |
| 2,772,135 | Hollabaugh et al. | Nov. 27, 1956 |